United States Patent
Armbruster et al.

[11] Patent Number: 5,950,132
[45] Date of Patent: Sep. 7, 1999

[54] METHOD AND APPARATUS FOR PROVIDING COMMUNICATION SERVICES FOR COMMUNICATION SYSTEM USERS HAVING VARIABLE SPEED

[75] Inventors: Peter J. Armbruster; Ken Sowles; Edward John Neyens, all of Chandler, Ariz.

[73] Assignee: Motorola, Inc., Schaumburge, Ill.

[21] Appl. No.: 09/010,299

[22] Filed: Dec. 21, 1997

[51] Int. Cl.[6] .................................................. H04Q 7/20
[52] U.S. Cl. .................... 455/435; 455/440; 455/441; 455/444; 455/432
[58] Field of Search .................................. 455/435, 440, 455/441, 444, 456, 457, 512, 553, 432, 450, 427, 12.1

[56] References Cited

U.S. PATENT DOCUMENTS

| | | | |
|---|---|---|---|
| 5,235,633 | 8/1993 | Dennison et al. | 455/440 X |
| 5,379,451 | 1/1995 | Nakagoshi et al. | 455/435 |
| 5,513,380 | 4/1996 | Ivanov et al. | 455/444 |
| 5,559,865 | 9/1996 | Gilhousen | 455/431 |
| 5,588,043 | 12/1996 | Tiedemann, Jr. et al. | 455/435 |
| 5,649,286 | 7/1997 | Frerking | 455/435 |

*Primary Examiner*—Wellington Chin
*Assistant Examiner*—Yemane Woldetatios
*Attorney, Agent, or Firm*—Frank J. Bogacz

[57] ABSTRACT

A method and apparatus used by a communication system (100) to optimize the re-registration of communication system users that use a variable speed multiple-user communication unit (VSMCU) (110). VSMCUs (110) can be located on mobile vehicles, these mobile vehicles can move at different speeds at different times. VSMCUs (110) can collect registration information, obtain velocity information, determine re-registration distances, and determine re-registration factors. VSMCUs (110) send re-registration factors to the system. The system uses the re-registration factors to determine a modified ring-alert area for the associated VSMCU.

36 Claims, 4 Drawing Sheets

METHOD AND APPARATUS FOR PROVIDING COMMUNICATION SERVICES FOR COMMUNICATION SYSTEM USERS HAVING VARIABLE SPEED

FIELD OF THE INVENTION

The present invention relates generally to satellite communication systems. More specifically, the present invention relates to providing communication services for communication system users moving at high or variable speed.

BACKGROUND OF THE INVENTION

The communication system users use various devices (e.g., a cellular telephone or pager) to communicate with other communication system users within the communication system. Each communication process involves an exchange of messages between the communication system user and the system. Registration is one of these communication processes. Each registration process involves an exchange of registration messages between the communication system user and the system. Registration may also be used to keep track of the subscriber so that the system knows where to send messages that indicate an incoming call for that subscriber.

A communication system user in a mobile communication system occasionally performs a re-registration procedure which can be used to inform the system of the communication system user's current location. Location registration is required to enable the system to contact the communication system user when an incoming communication attempt is destined for the communication system user. As the communication system user moves, the communication system user must occasionally re-register with the system. The speed at which users move can provide additional problems.

The speed at which some vehicles travel is particularly troublesome when groups of communication system users which are located on a mobile vehicle (e.g., communication units on-board an airplane) individually register with a system. Prior-art mobile group registration procedures require each communication system user to register individually with the system. This lack of flexibility results in a large amount of non-revenue generating work which has to be performed to provide communication services to users located on-board high speed vehicles such as airplanes and high speed trains.

What is needed are a method and apparatus for providing communication services to users who are located in high-speed mobile vehicle. Further needed are a method and apparatus to reduce the amount of non-revenue bearing work which has to be perform by a system to support communication services with high-speed users.

DETAILED DESCRIPTION OF A PREFERRED EMBODIMENT

The method and apparatus of the invention enable a communication system to provide communication services to users who are located in high-speed mobile vehicle. Further, the method and apparatus of the invention reduce the amount of non-revenue bearing work which has to be performed by a system to support communication services with high-speed users.

The method comprises determining a speed of a variable speed multiple-user communication unit (VSMCU) on a mobile vehicle and collecting user service information (e.g., re-registration information) from multiple system users who are located on the mobile vehicle. The method further comprises sending the speed information for the VSMCU to the system.

Embodiments of the invention are applicable to systems including satellites having low-earth, medium-earth and geo-synchronous orbits. Additionally, embodiments of the invention are applicable to orbits having any angle of inclination (e.g., polar, equatorial or other orbital patterns).

Figure 1:
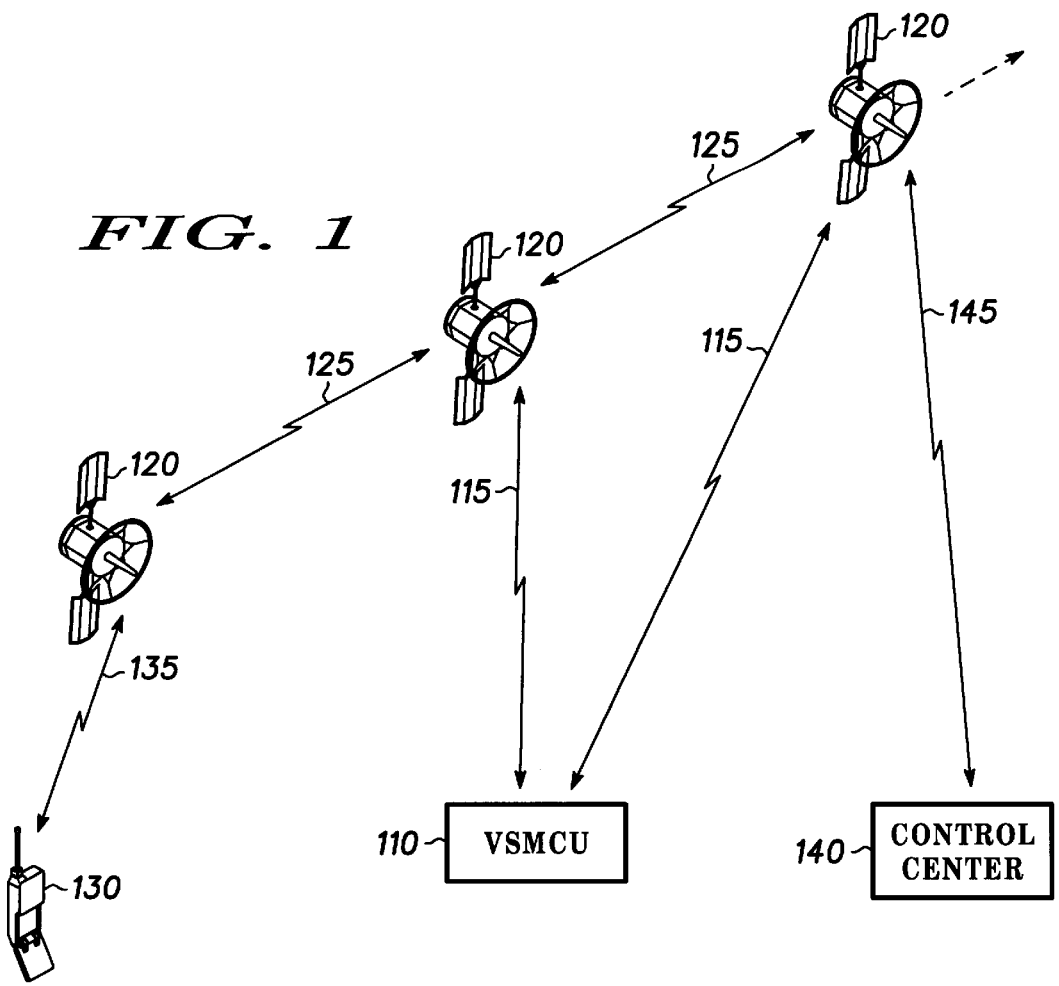
FIG. 1 shows a general view of satellite communication system 100 according to a preferred embodiment of the invention.

FIG. 1 shows a general view of satellite communication system 100 according to a preferred embodiment of the invention. Communication system 100 comprises at least one variable speed multiple-user communication unit (VSMCU) 110, a plurality of satellites 120, at least one user terminal 130, at least one control center 140. Generally, communication system 100 can be viewed as a network of nodes. All nodes of communication system 100 are or can be in data communication with other nodes of communication system 100 through communication links (115, 125, 135, and 145). In addition, all nodes of communication system 100 are or can be in data communication with other devices dispersed throughout the world through terrestrial networks and/or other conventional terrestrial user terminals coupled to communication system 100 through user terminals such as user terminal 130.

The present invention is applicable to satellite communication systems that use multiple beams, which are pointed towards the earth, and preferably, to satellite communication systems that move beams across the surface of the earth. Also, the invention is applicable to satellite communication systems having at least one satellite in a non-geosynchronous orbit or geosynchronous orbit around earth. There can be a single satellite or many satellites in a constellation of satellites orbiting the earth. The invention is also applicable to satellite communication systems having satellites which orbit the earth at any angle of inclination including polar, equatorial, inclined or other orbital patterns. The invention is also applicable to systems where full coverage of the earth is not achieved. The invention is also applicable to systems where plural coverage of portions of the earth occurs (e.g., more than one satellite is in view of a particular point on the earth's surface).

Each satellite 120 communicates with other adjacent satellites 120 through cross-links 125. These cross-links form a backbone in satellite communication system 100. Thus, data from one user terminal 130 located on or near the surface of the earth can be routed through a satellite or a constellation of satellites to VSMCU 110 located at substantially any other point on or near the surface of the earth. For clarity, FIG. 1 illustrates only a few of satellites 120.

VSMCUs 110 can be located at various points on the surface of earth or in the atmosphere above earth. Communication system 100 can accommodate any number of VSMCUs 110. VSMCUs 110 are preferably multi-user terminals capable of transmitting and/or receiving data from satellites 120. By way of example, VSMCUs 110 may be located on an aircraft or other variable speed vehicle. Moreover, VSMCUs 110 can comprise computers capable of sending email messages, video transmitters or facsimile machines. In a preferred embodiment, VSMCUs 110 have been adapted to use the procedures described below to optimize re-registration traffic.

VSMCUs 110 are preferably communications devices capable of transmitting data to and receiving data from communication satellites 120 on many different channels at the same time. Ordinarily, VSMCUs 110 need not perform any control functions for communication system 100 but may provide control functions for a local network on a mobile vehicle.

User terminals 130 can also be located at various points on the surface of earth or in the atmosphere above earth. Communication system 100 can accommodate any number of user terminals 130. User terminals 130 are preferably user terminals capable of transmitting and/or receiving data from satellites 120. By way of example, user terminals 130 can comprise computers capable of sending email messages, video transmitters or facsimile machines. One VSMCU 110 and one user terminal 130 are shown in FIG. 1 for clarity and ease of understanding.

Control center 140 can also be located at various points on the surface of earth or in the atmosphere above earth. Communication system 100 can accommodate a single control center 140 or many control centers 140. Control centers 140 are preferably devices capable of transmitting and/or receiving data from satellites 120. This data can include, among other things, command and control data.

In a preferred embodiment of the invention, VSMCUs 110 communicate with nearby satellites 120 through data links 115. User terminals 130 communicate with nearby satellites 120 through data links 135. Control centers 140 communicate with nearby satellites 120 through data links 145. Links 115, 125, 135, and 145 encompass a limited portion of the electromagnetic spectrum that is divided into numerous channels. Links 115 are preferably L-Band, but alternate embodiments may use S-Band, K-band, or any other microwave frequencies. Links 115 can encompass Frequency Division Multiple Access (FDMA) and/or Time Division Multiple Access (TDMA) and/or Code Division Multiple Access (CDMA) communication channels or combinations thereof.

Because of the relative movement between communication satellites 120 and VSMCUs 110, communication link 115 is a temporary one and hand-off schemes are employed to realize a continuous communication channel.

VSMCUs 110 are preferably communications devices capable of transmitting data to and receiving data from communication satellites 120 on many different channels at the same time. Ordinarily, VSMCUs 110 need not perform any control functions for communication system 100 but may provide control functions for a local network on a mobile vehicle.

At a minimum, satellite 120 continuously transmits over one or more broadcast channels. VSMCUs 110 synchronize to at least one broadcast channel and monitor at least one broadcast channel to detect data messages which are addressed to them. VSMCUs 110 can transmit messages to communication satellites 120 over one or more acquisition channels. Broadcast channels and acquisition channels are not dedicated to any one VSMCU but are shared by all VSMCUs 110 and user terminals 130 currently within view of satellite 120.

Traffic channels are two-way channels that are assigned to particular VSMCUs 110 and user terminals 130 by communication satellites 120 from time to time. In the preferred embodiments of the present invention, a digital format is used to communicate data over all channels, and traffic channels support real-time communications. At least one traffic channel is assigned for each call, and each traffic channel has sufficient bandwidth to support, at a minimum, a two-way voice conversation. To support real-time communications, a TDMA scheme is desirably used to divide time into frames, preferably in the 60–90 millisecond range.

Figure 2:
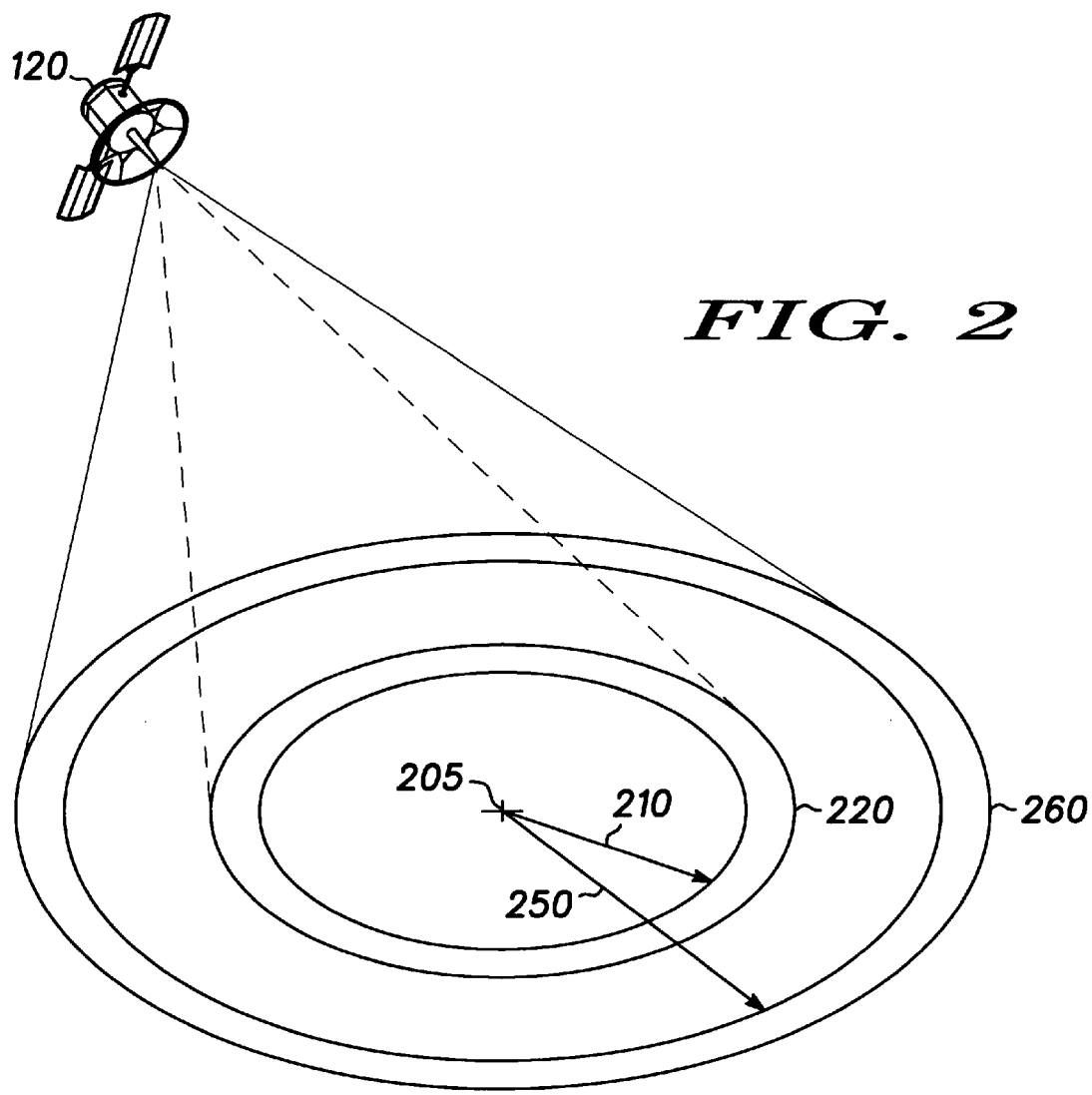
FIG. 2 illustrates a simplified diagram of a variable speed multiple-user communication unit (VSMCU) and a number of areas established around an VSMCU in accordance with a preferred embodiment of the present invention.

FIG. 2 illustrates a simplified diagram of an VSMCU and a number of areas established around an VSMCU in accordance with a preferred embodiment of the present invention. VSMCU 110 has, among other things, a current location 205 associated with it. VSMCU 110 also has a re-registration distance 210 associated with it. Re-registration distance 210 is the distance an VSMCU can travel before it is required to re-register with the system. Satellite 120 has a ring-alert area 220 associated with it. Ring-alert area 220 is the area used by the satellites in the communication system to contact a user. A ring-alert area is used to determine which broadcast channels are used and which information is sent on particular broadcast channels.

Each satellite 120 includes at least one array antenna (not shown). Each array antenna can project a plurality of discrete antenna beams on the earth's surface at numerous diverse angles away from its satellite 120. Typically, a beam's projection on the surface of the earth is known as a cell. The pattern of cells which a single satellite 120 projects on the earth's surface is referred to as a footprint. Ring-alert area 220 can include a single cell or many cells. The size of ring-alert area 220 can vary in response to the location of the satellites 120 and the size and location of the beams.

VSMCU 110 has at least one modified re-registration distance 250 associated with it. Modified re-registration distance 250 is a new distance VSMCU 110 can travel before it is required to re-register with the system. Modified re-registration distance 250 is determined using a speed which is currently associated with VSMCU 110.

VSMCU 110 also has at least one modified ring-alert area 260 associated with it. Modified ring-alert area 260 is a new area which the system uses to ensure that VSMCU 110 can be contacted. Modified ring-alert area 260 is determined using a speed associated with VSMCU 110. For example, when the system needs to contact a user associated with a VSMCU, the system broadcasts a ring-alert message over the modified ring-alert area.

Figure 3:
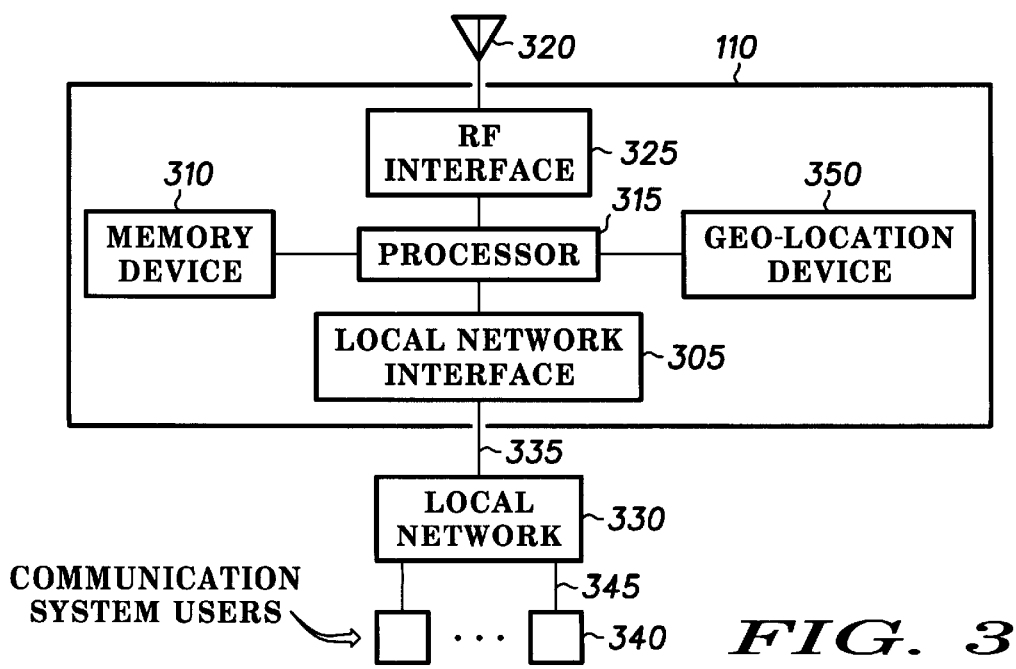
FIG. 3 shows a simplified block diagram of a VSMCU and associated components in accordance with a preferred embodiment of the present invention.

FIG. 3 shows a simplified block diagram of a VSMCU and associated components in accordance with a preferred embodiment of the present invention. VSMCU 110 is used along with local network 330 to provide communication capabilities for multiple subscribers 340. VSMCU 110, local network 330, and subscribers 340 can be located in close proximity, such as on an airplane. In a preferred embodiment, VSMCU 110 includes local network interface 305, memory device 310, processor 315, antenna 320, RF interface 325, and geo-location device 350. In alternate embodiments, VSMCU 110 can include a decryption/encryption device.

Local network interface 305 enables processor 315 to exchange data and messages with local network 330 over links 335. Subscribers 340 exchange data and messages with local network 330 over links 345. Links 335 and/or 345 can be hard-wired or RF communication links. Data and messages exchanged between processor 315 and subscribers 340 via local network 330 include, but are not limited to, subscriber registration information, registration status information, call setup information, and speech/data/fax information. The local network can comprise, for example, telephone handsets, faxes, computers, or data processing units which are coupled to VSMCU 110 using hard wired, optical, or RF links.

In a preferred embodiment of the present invention, a relatively large number of subscribers can be under the control of processor 315. Typically, the normal response of such a processor would have been to determine the point at which a re-registration distance has been exceeded and begin re-registering users. However, since the system is constrained to the number of re-registrations it can process at a given time, such a large re-registration load can detrimentally affect the system.

The more registered subscribers being managed by a VSMCU which is moving with respect to the registration zone boundaries the greater the number of system resources which are consumed when the VSMCU exceeds the re-registration distance. This registration distance is needed because the system needs to send messages to the registered users to alert them to incoming calls. These alert messages will be sent within a ring-alert region defined by a subscriber's last registration location and the re-registration distance associated with the VSMCU. When the subscriber moves far enough away from his last registered location, he needs to register again with the system in order to continue to be able to receive incoming calls.

In a preferred embodiment, processor 315 predicts when the current re-registration distance is going to be exceeded. Processor 315 uses the act of exceeding a fixed distance from the last registration point as a criterion for re-registration. In alternate embodiments, processor 315 can distribute the re-registrations for the subscribers it controls to, among other things, reduce the impact on the system for all of the co-located subscribers registering at once.

In a preferred embodiment, processor 315 processes information from those subscribers 340 who request to register and/or who request to use other subscriber services while communicating with the communication system via the VSMCU. Processor 315 determines location information for the VSMCU using geo-location device 350. Processor 315 determines heading and velocity in order to predict when the VSMCU will exceed the registration distance. In an alternate embodiment, processor performs location determining procedures using information from the communication system.

In a preferred embodiment, processor 315 also determines when the current re-registration distance is going to be exceeded. Processor 315 distributes over time the re-registrations for the subscribers it controls to, among other things, reduce the impact on the system.

Via local network interface 305, processor 315 can inform each of the subscribers 340 which want to use system services whether or not their request can be accomplished. Processor 315 can re-schedule some tasks for a later time based on the task's priority level. Processor 315 can also re-schedule tasks based on a success factor. For example, success factors can be used to prevent a single task from consuming too much time. This can occur if a task is allowed to run until it is successfully completed. Also, success factors can be used for tasks that require more than one step.

In a preferred embodiment, memory device 310 is used to store information which processor 315 requires in order to perform its necessary functions. Memory device 310 can be a random access memory, read only memory, or any other type of storage medium and can be integral with or separate from processor 315.

For example, memory device 310 includes status information for the RF interface which indicates problems with the communication link to the system satellites. In addition, memory device 310 may be used to store the re-registration boundary information for VSMCU 110. Also, memory device 310 may be used to store the location, velocity and direction information for VSMCU 110.

Local network interface 305 desirably supports the protocols necessary to transfer data to local network 330. Desirably, RF interface 325 is responsible for time and frequency accuracy, modulation and demodulation, frequency conversion, amplification, and the radiation and reception patterns. Antenna 320 is used to establish and maintain link 115 (FIG. 1) as required to operate VSMCU 110.

In a preferred embodiment of the present invention, a number of system subscribers are using VSMCU 110 (FIG. 1) to communicate with a satellite or multiple satellites in a communication system. In a preferred embodiment, each VSMCU 110 is capable of supporting as many as 100 radio channels into communication system 100 (FIG. 1). However, those of skill in the art will understand that more or fewer radio channels can be also supported. VSMCU 110 provides the radio channel access into communication system 100 (FIG. 1).

Figure 4:
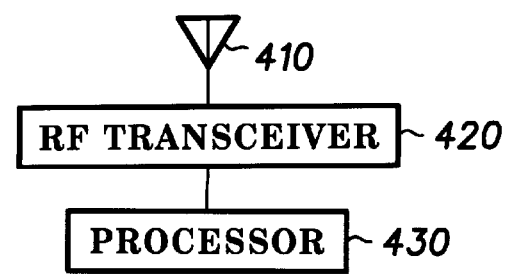
FIG. 4 illustrates a simplified block diagram of a control center which supports registration, call setup and other services for communication system users associated with a VSMCU in accordance with a preferred embodiment of the present invention.

FIG. 4 illustrates a simplified block diagram of a control center which supports registration, call setup and other services for communication system users associated with a VSMCU in accordance with a preferred embodiment of the present invention. Control center 140 (FIG. 1) provides control services and other user services for communication system users. Control center 140 can be a system control center or can be part of a system control center. Control center 140 can be a gateway or can be part of a gateway.

Control center 140 comprises antenna 410 which is used to establish link 145 (FIG. 1) to communication satellites 120 (FIG. 1) and RF transceiver 420 which provides, among other things, an interface to processor 430. The principle functions of processor 430 include managing radio channels and transferring signaling information to and from VSMCUs.

In a preferred embodiment, processor 430 includes, among other things, storage devices which contain the last known locations of communication system users registered with the system. When a communication system user is located with a mobile vehicle, the location information describes the last-known location of the mobile vehicle. The location information can be received as part of the user service information or in a message from the communication system.

In a preferred embodiment, a control center occasionally receives and processes registration information for users of the system associated with a VSMCU. Control center receives, among other things, velocity and location information from the VSMCU. For system users who are associated with a VSMCU, a control center can receive users' registration information from the VSMCU.

Control center 140 can contain a home location register (HLR) database which manages communication system user data and keeps track of a VSMCU's location as it roams around the earth. The HLR database is a reference data base for the VSMCU's parameters. For example, VSMCU's parameters can include information concerning the classification as a single user or a multi-user device. Various VSMCU identification numbers and addresses are stored within control center 140, as well as authentication parameters, services subscribed, and special routing information. Current VSMCU status is also preferably maintained, including a VSMCU's temporary roaming number and associated visitor location register (VLR) when roaming. Control center desirably includes an authentication center which is responsible for protecting against fraudulent VSMCU and system use.

In alternate embodiments, a control center can also contain a VLR database which preferably contains a copy of most of the data stored in the HLR database. This data is a temporary entry which exists only as long as a particular VSMCU is known to be operating within the area served by the VLR database. The VLR database provides a local database for an VSMCU which eliminates unnecessary interrogations of the HLR database. The VLR database may contain some duplicate memory devices data as well as more precise location information and status. The VLR database is used to help manage VSMCU data and keep track of the location of the VSMCUs.

In a preferred embodiment, processor 430 processes information from those users of communication system users who request to register and/or who request to use other user services while communicating with the communication system via the VSMCU.

In alternate embodiments, processor 430 determines location information for the VSMCU. In other embodiments, processor 430 determines the re-registration factor and sends it to the VSMCU. Processor 430 also creates one or more messages which contain identification information for the VSMCU, geo-location information and individual user service information for each user of the group.

Processor 430 provides the call setup and tear-down sequencing and other management procedures for RF transceivers 420. Processor 430 and RF transceivers 420, among other things, are responsible for time and frequency accuracy, modulation and demodulation, frequency conversion, amplification, and the radiation and reception patterns.

Figure 5:
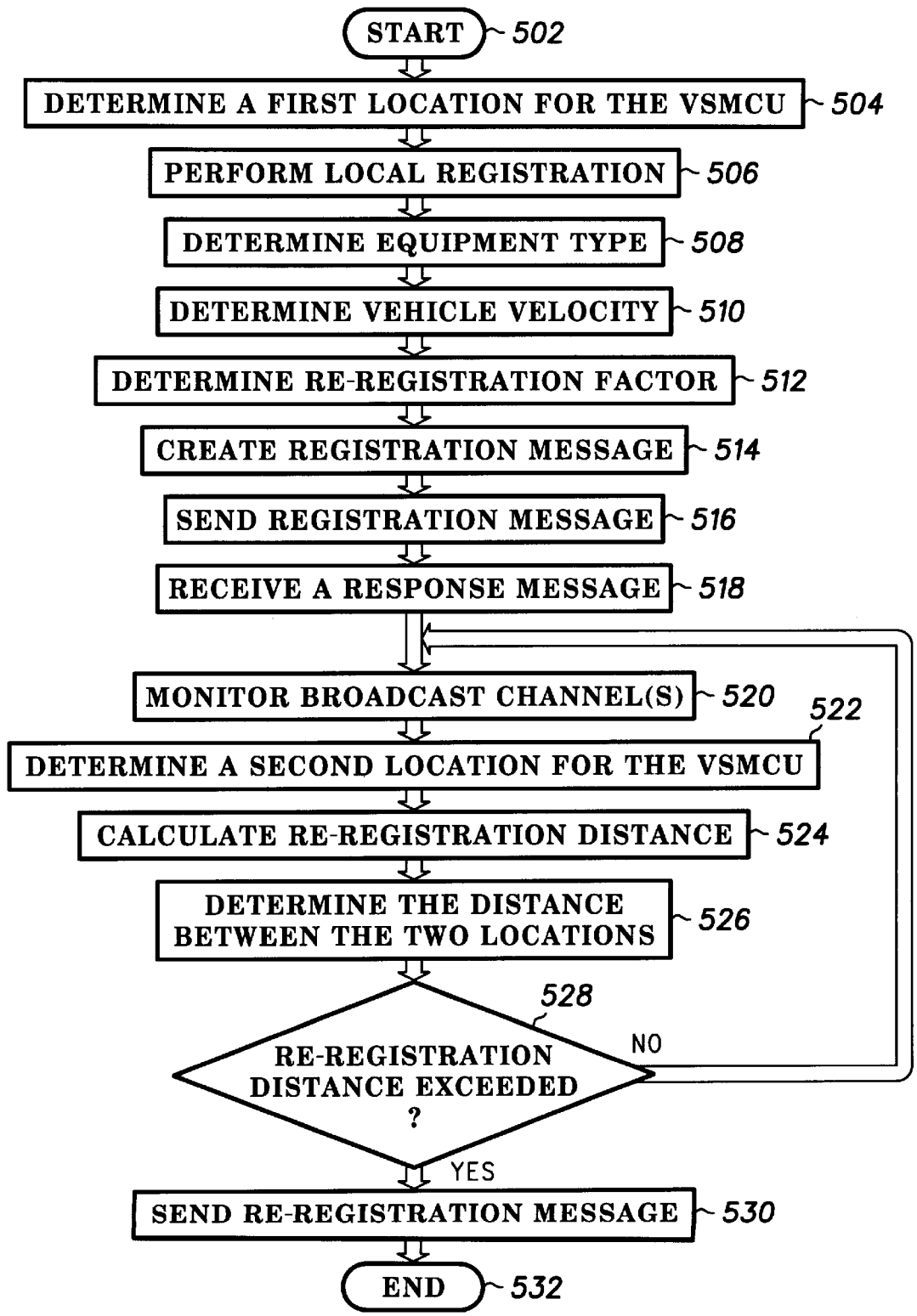
FIG. 5 illustrates a flowchart of a procedure for providing communication services to a number of communication system users located on a variable speed vehicle.

FIG. 5 illustrates a flowchart of a procedure for providing communication services to a number of communication system users located on a variable speed vehicle. The N communication system users use a VSMCU associated with a variable speed vehicle to obtain communication services from a communication system.

Typically, a VSMCU is located on the variable speed vehicle and provides user services for a group of communication system users located on-board the vehicle. The VSMCU establishes links to satellites within the communication system in accordance with a preferred embodiment of the present invention. Alternate embodiments are envisioned which have multiple VSMCUs on the same vehicle.

In a preferred embodiment, at least one VSMCU which is located with the vehicle provides at least one communication link with at least one communication satellite. In a preferred embodiment, a local network is also located with the vehicle. The procedure starts in step 502. For example, step 502 could be the result of a passenger or a group of passengers boarding an aircraft.

In step 504, the VSMCU determines its location. In a preferred embodiment, the VSMCU receives location data from a geo-location subsystem located on the variable speed vehicle. Location information is only required for the VSMCU since all of the passengers on board the vehicle will only be geo-located to this resolution. Geo-location information is used by the system to know where to contact the user. In other embodiments, the location information can be derived using satellites in the communication system, for example, using beam position data and signal strength measurements.

In a preferred embodiment, geo-location information is used to determine when re-registration boundaries are exceeded. Geo-location information can also be used to determine speed and/or direction.

In alternate embodiments, geo-location information can also be used for access denial. User service agreements can be based on geo-physical and political boundaries. In which case, certain restrictions may be applied to particular VSMCUs based on user service boundaries.

In step 506, a local registration procedure is performed. This occurs when users access the local network and request registration with a communication system.

In step 508, the VSMCU determines its unit type. For example, a communication unit can be an aeronautical unit or a handheld unit. In addition, communication units can be safety, or non-safety units.

In step 510, the VSMCU determines its velocity. In a preferred embodiment, the VSMCU receives velocity data from another subsystem located on the variable speed vehicle.

In one alternate embodiment, a user can supply velocity information using a user interface unit. For example, a user could input an estimated velocity based on an expected velocity for a variable speed vehicle.

In a second embodiment, the VSMCU can periodically perform location determination procedures and thereby determine a velocity.

In another alternate embodiment, the velocity information can be derived using satellites in the communication system, for example, using Doppler and time delay measurements.

In step 512, the VSMCU determines a re-registration factor based on the VSMCU's unit type and VSMCU's velocity. When an VSMCU is associated with a variable speed vehicle, then a linear multiplier is used, and this linear multiplier is dependent on the velocity. For example, a re-registration factor can be determined by dividing the VSMCU's velocity by a nominal velocity, and the nominal velocity can be dependent on the VSMCU's unit type.

In step 514, the VSMCU creates a registration message to send to the communication system. In a preferred embodiment, each VSMCU is assigned a control center. The control center can be a gateway or other terrestrial station.

In a preferred embodiment, the registration message comprises the unit type data, the first location, the re-registration factor, and individual registration information for any communication system users that requested registration.

In step 516, the VSMCU sends the registration message to its control center. The VSMCU establishes at least one link with at least one satellite in the communication system. The control center also establishes at least one link with at least one satellite in the communication system and performs, among other things, steps as shown below in FIG. 6.

In step 518, the VSMCU receives a response message from the control center. In a preferred embodiment, the response message comprises a first set of broadcast channels, a unit type data status for the VSMCU, a first location status for the VSMCU, a re-registration factor status for the VSMCU, and registration status for the communication system users that are requesting registration.

In step 520, the VSMCU monitors at least one of the first set of broadcast channels. The broadcast channel provides the VSMCU with information concerning which acquisition channel or channels the VSMCU should use when it attempts to establish contact with the system. Broadcast channels are used to send alert messages to communication system users that have registered with the system.

In step 522, the VSMCU determines a new location. The second location is determined using the same method that was used to determine the first location in step 504.

In step 524, the VSMCU uses the re-registration factor to calculate a re-registration distance. In a preferred embodiment, all unit types are given the same nominal re-registration parameter, and the re-registration factor is used as a multiplier. A nominal re-registration distance is multiplied by the re-registration factor to obtain a new re-registration distance.

In step 526, the distance between the first and second locations is determined by the VSMCU.

In step 528, a query is performed to determine if the new re-registration distance has been exceeded. When the new re-registration distance has not been exceeded, then procedure 500 branches back to step 520. When the new re-registration distance has been exceeded, then procedure 500 branches to step 530.

In step 530, the VSMCU sends a re-registration message to the control center. The VSMCU, among other things, performs the steps as shown below in FIG. 7. In various embodiments, the VSMCU attempts to re-register all of the users that are still registered with the local network. In step 532, procedure 500 ends.

Figure 6:
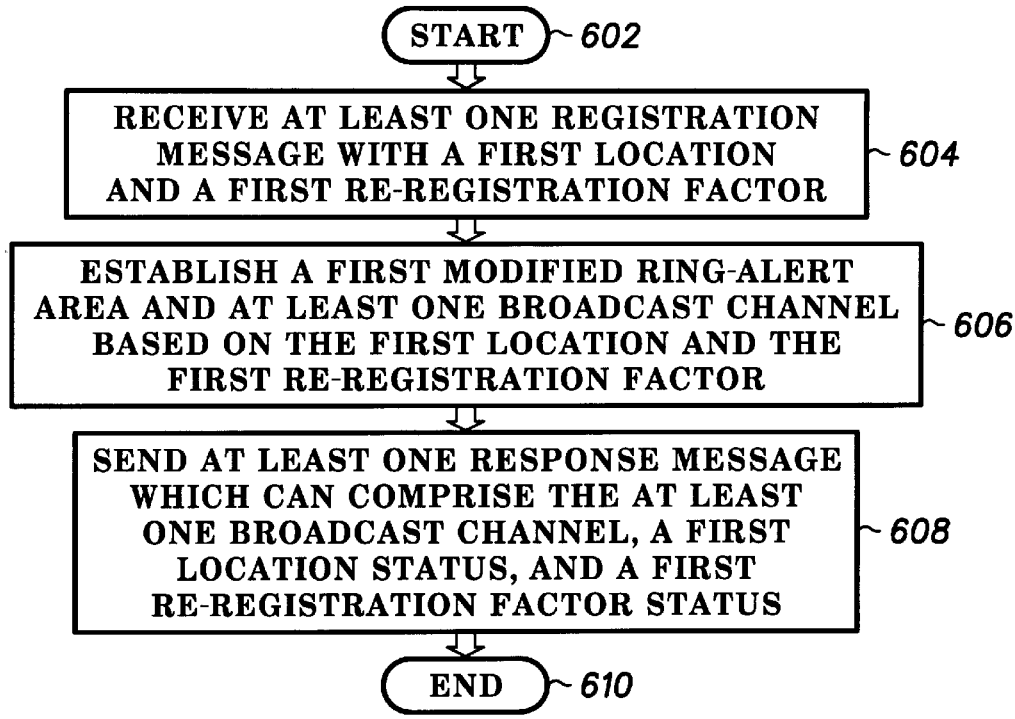
FIG. 6 illustrates a flowchart of a registration procedure performed by a control center in accordance with a preferred embodiment of the invention.

FIG. 6 illustrates a flowchart of a registration procedure performed by a control center in accordance with a preferred embodiment of the invention. Procedure 600 starts with step 602. This occurs when a VSMCU sends a registration message to the control center.

In step 604, the control center receives at least one registration message from a VSMCU. The registration message contains at least a first re-registration factor. In various embodiments, the message can comprise, among other things, a first location, unit type data, and registration information. The first location is the location associated with the VSMCU when it sent the registration message. The unit type data is the information which describes an equipment type for the VSMCU. The registration information is for at least one of the communication system users associated with the VSMCU.

In step 606, the control center establishes a first modified ring-alert area. The control center uses the first re-registration factor as a multiplication factor. The first modified ring-alert area is determined using the first re-registration factor as a multiplier. In determining the first modified ring-alert area, at least one of the dimensions used in determining the area is multiplied by the first re-registration factor. In a preferred embodiment, the control center also determines at least one broadcast channel which the system uses to contact the VSMCU in the modified ring-alert area.

The control center uses the first modified ring-alert area when one of the users associated with the VSMCU has to be contacted. For example, when a nominal ring-alert radius of 300 kilometers is used and a re-registration factor of 1.5 is determined for the VSMCU, then a modified ring-alert area is established having a radius equal to 450 kilometers. The control center broadcasts a ring-alert message in this modified ring-alert area.

In step 608, the control center sends at least one response message back to the VSMCU. The control center uses the first modified ring-alert area to determine where to send the response message.

In various embodiments, the response message can comprise, among other things, a broadcast channel, a unit type status, a first location status, a first re-registration factor status, and message information. The unit type status indicates whether or not the control center received usable data for the VSMCU's unit type. The first location status indicates whether or not the control center received usable data for the first location. The first re-registration factor status indicates whether or not the control center received usable data for the re-registration factor. The message information can include, among other things, an alert message. Procedure 600 continues to step 610 and ends.

Figure 7:
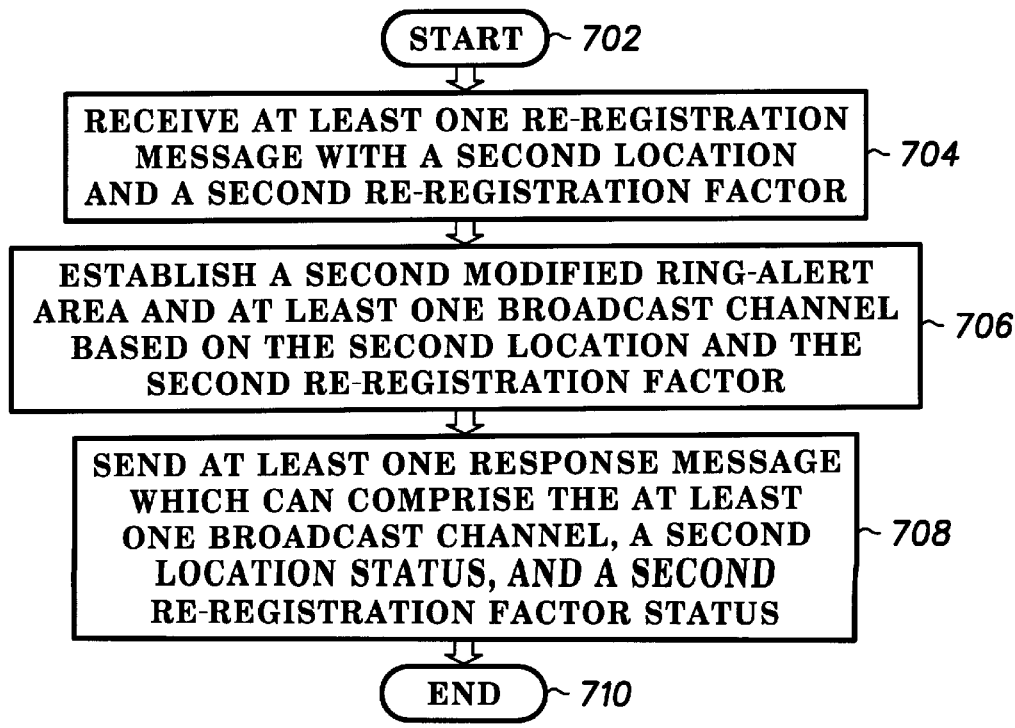
FIG. 7 illustrates a flowchart of a re-registration procedure performed by a control center in accordance with a preferred embodiment of the invention.

FIG. 7 illustrates a flowchart of a re-registration procedure performed by a control center in accordance with a preferred embodiment of the invention. Procedure 700 starts with step 702. This occurs when a VSMCU sends a re-registration message to the control center.

In step 704, the control center receives at least one re-registration message from a VSMCU. The re-registration message contains at least a second re-registration factor. In various embodiments, the message can comprise, among other things, a second location, unit type data, and re-registration information. The second location is the location associated with the VSMCU when it sent the re-registration message. The second location is far enough from the first location to exceed the first re-registration distance. The unit type data is the information which describes an equipment type for the VSMCU. The re-registration information is for at least one of the communication system users associated with the VSMCU.

In step 706, the control center establishes a second modified ring-alert area. The control center uses the second re-registration factor as a multiplication factor to determine a second modified ring-alert area. The second re-registration factor does not have to be the same as the first re-registration factor. The second modified ring-alert area is determined using the second re-registration factor as a multiplier. In determining the second modified ring-alert area, at least one of the dimensions used in determining the area is multiplied by the second re-registration factor. In a preferred embodiment, the control center also determines at least one broadcast channel which the system uses to contact the VSMCU in the second modified ring-alert area. The broadcast channel for the second modified ring-alert area does not have to be the same as the broadcast channel used for the first modified ring-alert area.

In step 708, the control center sends at least one response message back to the VSMCU. The control center uses the second modified ring-alert area to determine where to send this response message.

In various embodiments, the response message can comprise, among other things, a second set of broadcast channels, a unit type status, a second location status, a second re-registration factor status, and message information. The second set of broadcast channels can comprise a single broadcast channel. The second set of broadcast channels can be the same as the first set of broadcast channels. Broadcast channels can be used, among other things, to make initial contact, or to send pages or ring alerts.

The unit type status indicates whether or not the control center received usable data for the VSMCU's unit type. The second location status indicates whether or not the control center received usable data for the second location. The second re-registration factor status indicates whether or not the control center received usable data for the second re-registration factor. The message information can include, among other things, an alert message. Procedure 700 continues to step 710 and ends.

One or more users can request re-registration or the VSMCU can perform a multiple user re-registration. In the case of a multiple user re-registration, the VSMCU can collect the re-registration information, for example, by prompting each potential system user to enter his or her registration information. Each potential user who wishes to re-register with the communication system can then enter their registration information. Registration information can be entered, for example, by entering digits into a keypad or by inserting a magnetically coded card or the user device can determine the necessity to register autonomously from the user. In a preferred embodiment, the communication system user is identified by a Subscriber Information Module (SIM). The VSMCU collects the re-registration information.

Typically, the VSMCU sends the message over an RF link between the VSMCU and the communication system. However, a vehicle which can communicate over hard-wired links (e.g., a mobile vehicle riding on a rail) could send the message over a hard-wired link such as through a rail. In alternate embodiments, terrestrial links or a combination of space-based and terrestrial links could be used.

The VSMCU receives and processes messages from the communication system. A message can indicate whether or not the VSMCU has been successfully identified. In some cases, a message can indicate whether or not the VSMCU was successfully located. A message can also be used to indicate which user or users the communication system has successfully re-registered and/or which user or users the communication system has not successfully re-registered.

In alternate embodiments, a VSMCU can inform each user via the local network of his or her re-registration status (i.e., as either successful or unsuccessful). In other alternate embodiments, a VSMCU could only inform those users who have not been successfully re-registered, or could only inform those users who have been successfully registered. In another alternate embodiment, the VSMCU could inform a user of his or her re-registration status only when the user attempts to establish a communication link with a non-passenger.

For purposes of this description, when a message is transferred along a communication path between an VSMCU and a control center, the particular transmission medium and number of intermediate nodes which comprise the path are not important to the invention and can be varied depending on the system. For example, a communication path between an VSMCU and a control center might include an RF link between the VSMCU and a satellite, several cross-links between satellites, a down-link to a first terrestrial station, and land-line links between the first control center and the final terrestrial station. A different communication path might include an RF link between an VSMCU and a user terminal, and one or more bent-pipe satellite connections with user terminals. Any number of different communication paths could be used.

In summary, by combining a modified re-registration distance with a modified ring-alert area determined from a re-registration factor, the method and apparatus of the invention enable re-registering individuals or individual members of a group of communication system users who are located together in a mobile vehicle.

What is claimed is:

1. A method for providing communication services to communication system users associated with a vehicle, said communication system users using a variable speed multiple-user communication unit (VSMCU) associated with said vehicle to obtain communication services from a communication system, the method comprising said steps of:

determining a first location for said VSMCU;
   determining a unit type for said VSMCU;
   determining a velocity for said vehicle, said velocity being associated with said communication system users;
   determining a re-registration factor for said communication system users based on said unit type and said velocity; and
   creating at least one registration message which comprises said first location and said re-registration factor.

2. The method as claimed in claim 1, wherein said method further comprises the steps of:

performing a local registration for said communication system users; and
   including individual registration information for said communication system users in said at least one registration message.

3. The method as claimed in claim 2, wherein said method further comprises the step of:

collecting individual registration information for individual users, said individual users using a local network coupled to said VSMCU to request registration with said communication system.

4. The method as claimed in claim 1, wherein said method further comprises the step of:

sending said at least one registration message to a control center in said communication system.

5. The method as claimed in claim 4, wherein said method further comprises the steps of:

receiving said at least one registration message;
   establishing a first modified ring-alert area for said communication system users, said first modified ring-alert area being established using said first location and said re-registration factor; and
   sending at least one first response message which comprises a first set of broadcast channels.

6. The method as claimed in claim 5, wherein said method further comprises the step of:

including a first location status for said VSMCU, a re-registration factor status for said VSMCU in said at least one first response message.

7. The method as claimed in claim 6, wherein said method further comprises the step of:

including registration status for said communication system users requesting registration in said at least one first response message.

8. The method as claimed in claim 5, wherein said method further comprises the step of:

receiving said at least one first response message from said control center in said communication system.

9. The method as claimed in claim 1, wherein said method further comprises the steps of:

monitoring at least one broadcast channel for a first amount of time;

determining a second location for said VSMCU;

establishing a re-registration distance based on said re-registration factor;

determining a difference between said first location and said second location;

sending at least one re-registration message to a control center in said communication system when said difference exceeds said re-registration distance, wherein said at least one re-registration message includes said second location; and returning to said monitoring step when said difference does not exceed said re-registration distance.

10. The method as claimed in claim 9, wherein said method further comprises the step of:

determining said second location for said VSMCU based on said velocity and said first amount of time.

11. The method as claimed in claim 9, wherein said method further comprises the steps of:

receiving geo-location data from a geo-location device; and determining a second location using said geo-location data.

12. The method as claimed in claim 9, wherein said method further comprises the steps of:

receiving said at least one re-registration message;

establishing a second modified ring-alert area for said communication system users, said second modified ring-alert area being established using said second location and said re-registration factor; and sending at least one second response message which comprises a second set of broadcast channels and a second location status for said VSMCU.

13. The method as claimed in claim 12, wherein said method further comprises the step of:

receiving said at least one second response message from said control center in said communication system.

14. The method as claimed in claim 13, wherein said method further comprises the step of:

monitoring at least one of said second set of broadcast channels.

15. A method of operating a control center in a communication system to provide communication services to communication system users associated with a vehicle, said communication system users using a variable speed multiple-user communication unit (VSMCU) associated with said vehicle to obtain communication services from said communication system, said method comprising said steps of:

receiving, by said control center, at least one registration message, wherein said at least one registration message comprises a first location of said VSMCU and a first re-registration factor of said VSMCU;

establishing, by said control center, a first modified ring-alert area for said communication system users, said first modified ring-alert area being established using said first location and said first re-registration factor and said first modified ring-alert area being used to determine a first set of broadcast channels; and sending, by said control center, at least one first response message to said VSMCU, wherein said at least one first response message comprises said first set of broadcast channels.

16. The method as claimed in claim 15, wherein said at least one registration message further comprises individual registration information for said communication system users.

17. The method as claimed in claim 16, wherein said method further comprises the step of:

including, by said control center, a first location status for said VSMCU, a re-registration factor status for said VSMCU in said at least one first response message.

18. The method as claimed in claim 17, wherein said method further comprises the step of:

including, by said control center, registration status for said communication system users requesting registration in said at least one first response message.

19. The method as claimed in claim 15, wherein said method further comprises the steps of:

receiving, by said control center, at least one re-registration message, said at least one re-registration message comprises a second location and a second re-registration factor;

establishing, by said control center, a second modified ring-alert area for said communication system users, said second modified ring-alert area being established using said second location and said second re-registration factor, said second modified ring-alert area being used to determine a second set of broadcast channels; and sending, by said control center, at least one second response message to said VSMCU, wherein said at least one second response message comprises said second set of broadcast channels.

20. The method as claimed in claim 19, wherein said at least one re-registration message further comprises individual registration information for said communication system users.

21. The method as claimed in claim 20, wherein said method further comprises the step of:

including, by said control center, a first location status for said VSMCU, a re-registration factor status for said VSMCU in said at least one first response message.

22. The method as claimed in claim 21, wherein said method further comprises the step of:

including, by said control center, registration status for said communication system users requesting registration in said at least one second response message.

23. A method of operating a variable speed multiple-user communication unit (VSMCU) in a communication system to provide communication services to communication system users associated with a vehicle, said communication system users using said VSMCU to obtain communication services from said communication system, wherein said VSMCU is also associated with said vehicle, said method comprising the steps of:

a) determining a unit type for said VSMCU;

b) determining a first location for said VSMCU;

c) performing a local registration for said communication system users;

d) determining a velocity for said vehicle, said velocity being associated with said communication system users;

e) determining a re-registration factor for said communication system users based on said velocity; and f) creating at least one registration message which comprises said unit type, said first location, said re-registration factor, and individual registration information for said communication system users.

24. The method as claimed in claim 23, wherein step c) further comprises the step of:

c1) collecting individual registration information for individual users, said individual users requesting registration with said communication system.

25. The method as claimed in claim 23, wherein said method further comprises the step of:

g) sending said at least one registration message to a control center in said communication system.

26. The method as claimed in claim 25, wherein said method further comprises the step of:

h) receiving at least one first response message from said control center in said communication system which comprises a first set of broadcast channels, a unit type data status for said VSMCU, a first location status for said VSMCU, a re-registration factor status for said VSMCU, and a registration status for said communication system users requesting registration.

27. The method as claimed in claim 26, wherein said method further comprises the steps of:

i) obtaining a second location for said VSMCU based on said velocity and a fixed amount of time;

j) establishing a re-registration distance based on said re-registration factor;

k) determining a difference between said first location and said second location; and l) sending at least one re-registration message to said control center in said communication system when said difference exceeds said re-registration distance, wherein said at least one re-registration message includes said second location.

28. The method as claimed in claim 27, wherein said method further comprises the step of:

m) monitoring said first set of broadcast channels when difference does not exceed said re-registration distance.

29. The method as claimed in claim 25, wherein said method further comprises the step of:

h) receiving at least one second response message from said control center in said communication system which comprises a second set of broadcast channels.

30. The method as claimed in claim 29, wherein said method further comprises the step of:

i) monitoring said second set of broadcast channels.

31. The method as claimed in claim 23, wherein step e) and step f) are replaced by the steps of:

e) determining a re-registration distance for said communication system users based on said velocity; and f) creating at least one registration message which comprises said unit type, said first location, said re-registration distance, and individual registration information for said communication system users.

32. A variable speed multiple-user communication unit (VSMCU), said VSMCU being located with a vehicle to provide communication services to at least one communication system user, comprising:

a) a transceiver for establishing at least one communication link with a communication system;

b) a processor coupled to said transceiver, said processor for determining a first and second location for said VSMCU, a unit type for said VSMCU, a velocity for said vehicle, and first and second re-registration factors for said VSMCU based on said unit type and said velocity, for creating at least one registration message, for creating at least one re-registration message, sending said at least one registration message to said transceiver, sending said at least one re-registration message to said transceiver;

c) a memory device coupled to said processor for storing said first and second location, said unit type, said velocity, and said first and second re-registration factors, said at least one registration message, and said at least one re-registration message; and d) a local network interface coupled to said processor, said local network interface for interfacing between said processor and at least one local network.

33. The VSMCU as claimed in claim 32, wherein said VSMCU further comprises:

a geo-location device for providing location information.

34. A control center in a communication system, comprising:

an earth terminal for receiving at least one registration message from a variable speed multiple-user communication unit (VSMCU) and for transmitting at least one first response message to said VSMCU; and an earth terminal controller coupled to said earth terminal, said earth terminal controller for processing said at least one registration message which comprises a first location of said VSMCU and a first re-registration factor of said VSMCU, for determining a first modified ring-alert area, for determining a first set of broadcast channels, for processing said at least one first response message.

35. The control center as claimed in claim 34, wherein said earth terminal further comprises means for receiving at least one re-registration message from a multiple-user communication unit (VSMCU) and for transmitting at least one second response message to said VSMCU.

36. The control center as claimed in claim 35, wherein said earth terminal controller further comprises means for processing said at least one re-registration message which comprises a second location and a second re-registration factor, for determining a second modified ring-alert area, for determining a second set of broadcast channels, for processing said at least one second response message.

* * * * *